(12) United States Patent
Hoffman

(10) Patent No.: US 6,508,490 B1
(45) Date of Patent: Jan. 21, 2003

(54) UNIVERSAL PIPE-TANK CONNECTION ASSEMBLY

(76) Inventor: John Hoffman, 16925 Londonberry Ln., South Bend, IN (US) 46635

(*) Notice: Subject to any disclaimer, the term of this patent is extended or adjusted under 35 U.S.C. 154(b) by 0 days.

(21) Appl. No.: 09/322,049

(22) Filed: May 28, 1999

(51) Int. Cl.[7] .............................................. F16L 35/00
(52) U.S. Cl. ....................... 285/24; 285/197; 285/139.2
(58) Field of Search .................... 285/24, 27, FOR 143, 285/139.2, 139.3, 206, 207, 208, 209, 348, 192, 196, 197, 198, 199, 139.1

(56) References Cited

U.S. PATENT DOCUMENTS

| | | | | |
|---|---|---|---|---|
| 2,464,332 A | * | 3/1949 | Maund et al. ............... | 285/192 |
| 2,568,301 A | * | 9/1951 | Pottberg et al. ............ | 285/348 |
| 3,033,514 A | * | 5/1962 | Grosch ........................ | 285/209 |
| 3,640,172 A | * | 2/1972 | Mercier ....................... | 285/208 |
| 5,000,489 A | * | 3/1991 | Burke .......................... | 285/24 |
| 5,149,144 A | * | 9/1992 | Blakeley ...................... | 285/24 |

FOREIGN PATENT DOCUMENTS

| | | | | |
|---|---|---|---|---|
| RU | 1362890 | * | 12/1987 | ........ 285/FOR 143 |

\* cited by examiner

*Primary Examiner*—Teri Pham Luu
(74) *Attorney, Agent, or Firm*—Ryan M. Fountain

(57) ABSTRACT

A universal holding tank connector fitting is provided which is formed from thermoplastic material and has a pass-though hub that enters the holding tank wall and is retained thereto by a sealing collar and a threaded nut engaging the sealing collar within the tank. Conformal seals are disposed between the hub and collar and the tank wall, with the hub and collar themselves keyed to the particular tank wall configuration. The hub includes an internal passageway into the tank which is dimensioned to closely receive the particular pipe, which is to be connected via a solvent weld, and, in certain embodiments, an end stop to limit and positively locate the pipe penetration into the tank. The conformal seals are keyed to fit at predetermined locations on the hub and collar, and load concentrating configurations are formed along the sealing surfaces that facilitate even and reliable seal pressure when the fitting elements are compressed together. The fitting components are readily adapted to different applications by the interchangeability of mold inserts within the tooling used to make the fittings. Hub penetration depth into the tank is selectable via skip threading on the hub end.

5 Claims, 2 Drawing Sheets

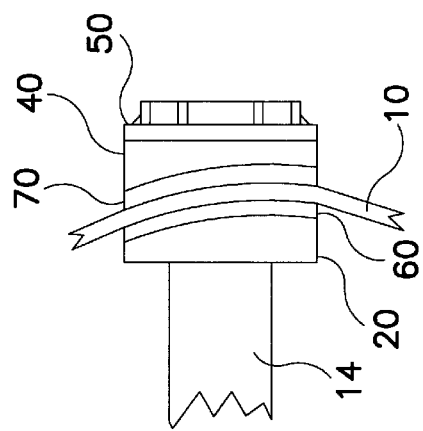
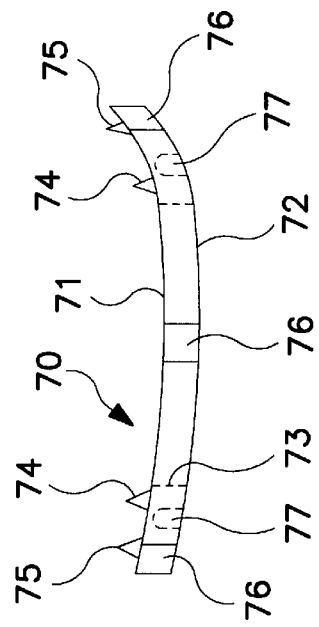
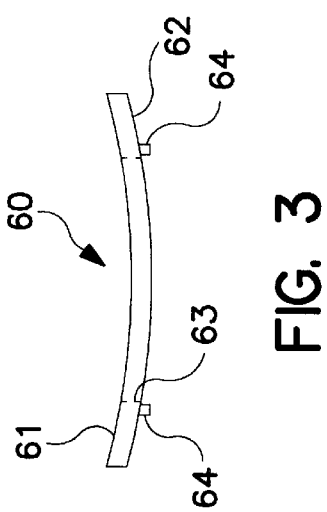

UNIVERSAL PIPE-TANK CONNECTION ASSEMBLY

BACKGROUND AND SUMMARY OF THE INVENTION

The present invention relates generally to fluid flow connections and, more particularly, to pipe-to-tank connectors in sewage discharge systems.

Numerous fluid flow systems employ fluid sumps to receive and retain fluid for a period of time. Many sewage discharge systems, for example, use holding tanks as a sump for waste fluids. Given the nature of the fluid carried to the holding tank and the proximity of the holding tank to the living environment, it is particularly important that the connections between the inlet pipe, outlet pipe and holding tank are securely fluid tight and reliable over long periods of time despite the system stresses imposed by the corrosive nature of the fluid and the vibrations transmitted into the fluid system.

Previously, fluid inlet connections to such holding tanks, for example, have employed cast iron fittings to join the plumbing pipes, typically formed from PVC material, to the holding tank, often formed from polyethylene or fiberglass materials. While those cast iron fittings could be durable for a reasonable period of time in many applications, prolonged contact with sewage fluid has been found to lead to corrosion, particularly of the bolt-through connectors that are often used to retained the fitting to the tank.

Moreover, in order to properly seal the connection, each holding tank configuration and inlet pipe size could require a specially formed cast iron fitting, since solvent welding of the connection (as typically used upstream in the PVC plumbing) has been unavailable or impractical given the diverse materials found at the connection. Over time, as holding tank configurations change to accommodate different spacial constraints and desired volumes, an ever larger inventory of cast iron fittings and tooling to form those fittings has been required for servicing.

Further, many fluid systems including the holding tanks have been redesigned to have less weight. Unfortunately, that weight reduction has sometimes been done with the result that the holding tank wall strength is less able to sustain the weight of the cast iron fittings. In addition, the relatively heavy weight of cast iron fittings has rendered them more costly to ship and more susceptible to damage during shipping.

Accordingly, it is an object of the present invention to provide an improved fluid connection arrangement for joining pipes to holding tanks and the like. Other objects include the provision of a holding tank connection assembly that:

a. is readily adaptable to a variety of tank configurations and sizes and pipe sizes, b. is light weight and inexpensive to manufacture and install, c. maintains a reliable, even seal against fluid leakage between the tank wall and the connector and pipe, d. permits solvent welding of the pipe to the connector, e. is less susceptible to corrosion when handling sewage fluid, and f. is relatively easy to install or replace in the field.

These and other objects of the present invention are achieved by the provision of a universal holding tank connector fitting formed from thermoplastic material and having a pass-though hub that enters the holding tank wall and is retained thereto by a sealing collar and a threaded nut engaging the sealing collar within the tank. Conformal seals are disposed between the hub and collar and the tank wall, with the hub and collar themselves keyed to the particular tank wall configuration. The hub includes an internal passageway into the tank which is dimensioned to closely receive the particular pipe which is to be connected via a solvent weld and, in certain embodiments, an end stop to limit and positively locate the pipe penetration into the tank. The conformal seals are keyed to fit at predetermined locations on the hub and collar, and load concentrating configurations are formed along the sealing surfaces that facilitate even and reliable seal pressure when the fitting elements are compressed together. The fitting components are readily adapted to different applications by the interchangeability of mold inserts within the tooling used to make the fittings. Hub penetration depth into the tank is selectable via skip threading on the hub end.

Other objects, advantages and novel features of the present invention will be readily apparent from the following drawings and description of preferred embodiments.

BRIEF DESCRIPTION OF THE DRAWINGS

FIG. 2 shows a side view of the assembled holding tank connection of FIG. 1.

FIG. 3 shows a cross sectional view of the outer conformal seal of the holding tank connection fitting of FIG. 1.

FIG. 4 shows a cross sectional view of the inner conformal seal of the holding tank connection fitting of FIG. 1.

Figure 1:
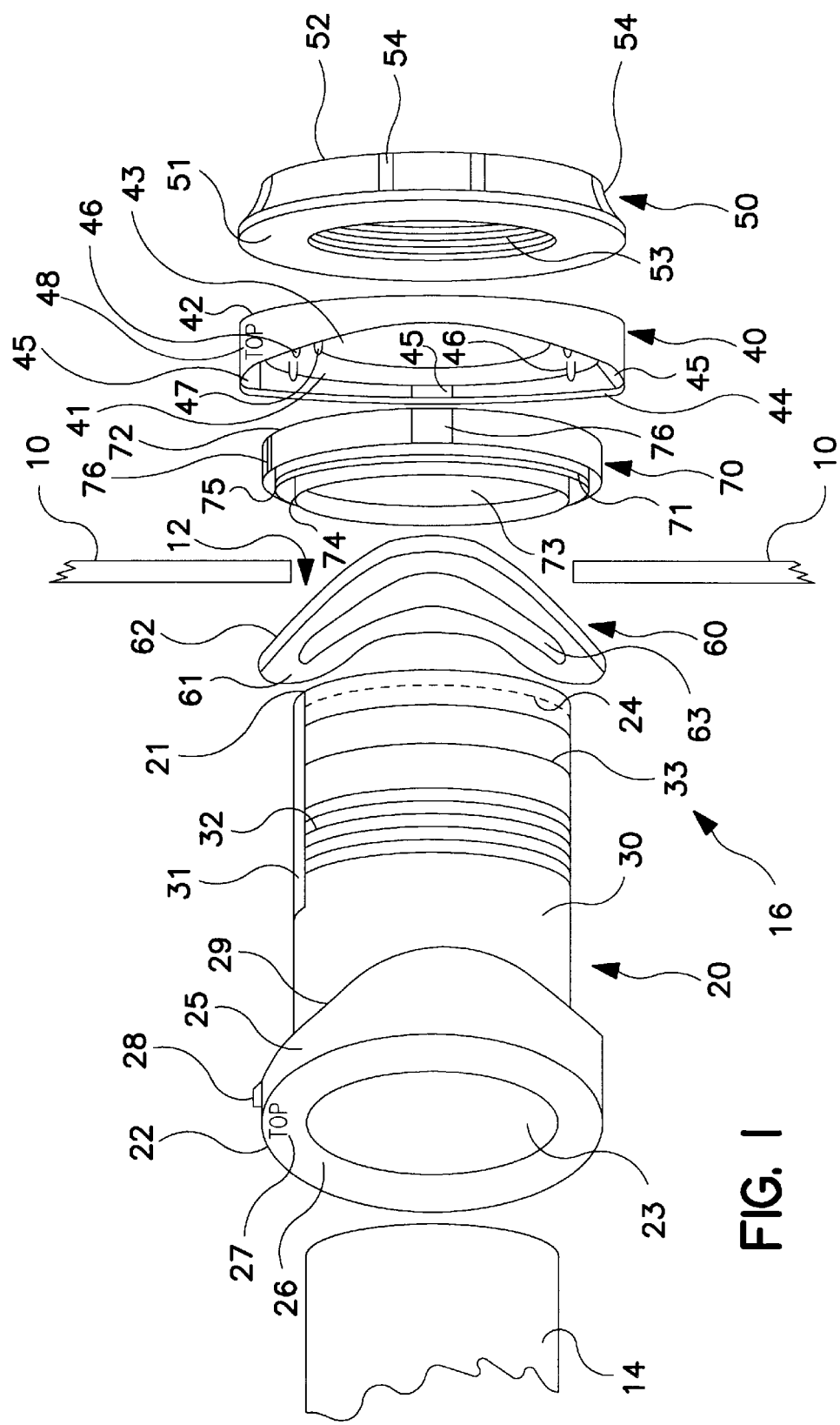
FIG. 1 shows an exploded top, left perspective view of a holding tank connection fitting incorporating the present invention, with the holding tank wall and inlet pipe shown in part.

The drawings are not shown to scale with respect to each other.

DETAILED DESCRIPTION OF PREFERRED EMBODIMENTS

FIG. 1, which illustrates a preferred embodiment of the present invention as applied to a holding tank—inlet pipe connection, shows a side wall 10 of a holding tank having an opening 12 therein, an inlet pipe or fluid conduit 14 and a connection fitting assembly 16. While only a sectional portion of side wall 10 is shown, it will be readily understood by those skilled in the art that the side wall can be flat, inclined or curved side to side and/or top to bottom adjacent opening 12, according to the design constraints on a particular holding tank. Inlet pipe 14 is intended to provide fluid, such as sewage from upstream plumbing facilities, to the holding tank. The holding tank may, for example, be installed in the basement of a home and formed from fiberglass or any other conventional material. Similarly, pipe 14 may be formed from any conventional material, although in the discussion below it will be assumed that pipe 14 is formed from PVC material.

Fitting assembly 16 includes hub member 20, sealing collar 40, threaded nut 50, outer conformal seal 60 and inner conformal seal 70. In especially preferred embodiments, all of fitting assembly 16 except the conformal seals is formed from molded PVC materials. The conformal seals are preferably formed instead from compressible, foamed flexible PVC material, the blowing agent for which being selected to provided the desired compressibility of the foam for particular applications. Suitable foamed PVC material for preferred applications is commercially available from Jackel, Inc. of Mishawaka, Indiana.

Hub member 20 has an interior end 21 and an exterior end 22. Hub member 20 includes an internal passageway 23 extending completely through the hub member from one end to the other. Passageway 23 is dimensioned, for example, to closely receive pipe 14 therein and permit solvent welding or cementing of the pipe to passageway 23 to form a fluid seal in conventional manner. Passageway 23 includes within it interior end stop 24 adjacent interior end 21. This stop prohibits passage of pipe 14 completely through passageway 23 and serves to positively position pipe 14 within passageway 23 when the pipe is fully mounted within the passageway. In certain applications, stop 24 can be omitted from Hub member 20 or cut off to allow further penetration of pipe 14 into the holding tank, as where, for example, pipe 14 is to be joined to interior pipes and fittings for fluid flow redirection and the like.

Hub member 20 also includes clamping boss 25 adjacent exterior end 22. The exterior face 26 of the boss is preferably a generally flat, finished surface that may advantageously include product identification information and/or mounting guides 27. Similarly, the circumferential surface of boss 25 may include orientation guides 28 to facilitate installation. Further, boss 25 includes an interior face 29 which is preferably shaped to conform generally (allowing, for example, for molding recesses spaced over that face) to the exterior configuration of side wall 10 adjacent opening 10 so that boss 25 can be generally flush with that side wall when fully installed.

Hub member 20 further includes a pass-through portion 30 adjacent boss 25 which, for example, conforms to the configuration of opening 12 and is able to be closely fit therethrough into the holding tank. A key slot 31 is disposed on the circumference of portion 30 to allow other portions of fitting assembly 16 to be aligned with hub member 20, and particularly with conformal, interior face 29, as will be detailed further below. Connection threads 32 are also formed on the circumference of portion 30, with or without skip threading 33 thereof formed adjacent interior end 21. Thus, hub member 20 can, for example, be formed to a standard length and cut in the field at a desired position within skip threading 33 according to the desired penetration length of hub member 20 for a given holding tank.

Outer conformal seal 60 includes an exterior surface 61, an interior surface 62 and a central aperture 63 formed to closely receive and slide over pass-through portion 30. While it serves in same ways as a typical compressible sealing gasket between boss 25 and side wall 10, conformal seal 60 is preferably not formed merely as a flat 0-ring. Instead, conformal seal is preferably molded to conform, prior to sealing compression, to the exterior surface contour of side wall 10 in much the same manner as interior face 29. Thus, for example, if side wall 10 has a side-to-side curve, when conformal seal 60 is viewed from the side it presents a similarly curved or serpentine shape prior to sealing compression. In this way, when boss 25 is compressed toward the holding tank, uneven compression stresses (often with resultant uneven fluid sealing) within conformal seal 60 can be minimized. Further, as shown in FIG. 3, conformal seal 60 preferably includes a load concentrating ridge 64 formed on interior surface 62 adjacent aperture 63 to provide improved sealing. Although not shown specifically in the drawings, in certain embodiments interior face 29 can be similarly formed with a load concentrating structure, either by a ridge or raised dimension adjacent pass-through portion 30.

Sealing collar 40 has an exterior surface 41, an interior surface 42 and a central aperture 43 formed to closely receive and slide over pass-through portion 30. Interior surface 42 can, for example, be formed with a generally flat face so as to evenly receive compressive force from the threading of nut 50 (even allowing for molding recesses spaced over that face). Exterior surface 42, on the other hand, is preferably shaped to conform generally to the internal configuration of side wall 10 adjacent opening 12 prior to sealing compression so that sealing collar 40 can be generally flush with the side wall when fully installed. Exterior surface 41 includes a retaining ridge 44 about its outer circumference for receiving therein inner conformal seal 70. Key tabs 45 and pins 46 are preferably formed on exterior surface 41 to positively locate conformal seal into a predetermined orientation. If advantageous in a given application, the portion of exterior surface 41 adjacent aperture 43 can include a load concentrating feature by, for example, having a raised dimension. Also, sealing collar 40 is preferably formed with a key tab 47 within aperture 43 which is receivable into key slot 31 to precisely orient sealing collar 40 with respect to hub member 20. Further, the outer circumferential surface of sealing collar 40 can be formed with orientation guides 48 to facilitate installation.

Inner conformal seal 70 includes an exterior surface 71, an interior surface 72 and an aperture 73 formed to closely receive and slide over pass-through portion 30. As with outer conformal seal 60 and boss 25, inner conformal seal 70 also serves in some ways as a compressible gasket between sealing collar 40 and side wall 10. However, inner conformal seal 70 is also preferably molded to conform, prior to compression, to the interior surface contour of the side wall it will engage, in much the same manner as exterior surface 42. Thus, inner conformal seal 70 may also appear curved or serpentine from a side view if side wall 10 is interiorly curved. In this way, when sealing collar 40 is compressed toward the holding tank, uneven compression stresses within conformal seal 70 can be minimized and better fluid sealing maintained.

Further, to achieve lower collapsing loads and concentrate compression forces, exterior surface 71 also includes two spaced apart ridges 74 and 75. Key slots 76 are formed on the outer circumference of conformal seal 70 to receive therein key tabs 45. Recesses 77 are formed on interior surface 72 to receive pins 46.

Threaded nut 50 includes an exterior face 51, an interior face 52 and a threaded aperture 53 formed to be rotatably received on connection threads 32. Radially outwardly directed nubs 54 are preferably formed about the outer circumference of interior face 52 so as to facilitate manual rotation of nut 50 in the treaded interface. Exterior face 51 is preferably flat, excepting perhaps for normal molding recesses therein, so as to present a flush engagement against interior surface 42 when fitting assembly 16 is mounted on side wall 10.

To assemble the fitting of the present invention, outer conformal seal 60 is mounted and oriented onto hub member 20 and then the hub member is inserted into opening 12. Inner conformal seal 70 is mounted and oriented onto sealing collar 40 and then the sealing collar is mounted onto pass-through portion 30. Nut 50 is then threaded onto pass-through portion 30 and rotated toward side wall 10, thereby compressing the fitting elements together and against side wall 10. Thereafter, pipe 14 can be inserted into passageway 23 and secured in place.

To accommodate different sized and/or configured holding tanks, differently configured inner and/or outer conformal seals can be readily substituted and, if necessary, a different sealing collar and/or differently bossed hub member can be used. To accommodate differently sized pipes, a differently apertured hub member can be used. In general, however, these modifications are readily accomplished both in terms of manufacturing and in field installation. In the manufacturing process, for example, different side wall shapes and pipe sizing are accommodated by mold inserts when forming the parts from plastic materials.

Although the present invention has been described above with respect to specific embodiments, that was done by way of illustration and example only and not as a limitation to invention. Those of ordinary skill in the art will now realize that within the present invention numerous other modifications and adaptations of specific embodiments can be made. For example, the interior and exterior orientations of hub member 20, collar 40 and nut 50 relative to each other may be reversed if advantageous in particular applications. Also, key tabs 45 and/or pins 46 can be formed to have load bearing functions, and pins 46 can be dimensioned to have an interference fit into seal 70 to retain the seal to collar 40 during assembly. In addition, the components of the preset invention can be formed and/or mounted so as to be reusable. Accordingly, the spirit and scope of the present invention are limited only by the terms of the claims below.

What is claimed is:

1. A fluid connection assembly for establishing a fluid seal between a fluid conduit and a non flat walled body, comprising:

a hub member for receiving the fluid conduit, a pass-through portion formed on the hub member for penetrating the walled body, sealing means, having uncompressed conformity to the exterior and interior surface configuration of the walled body, mounted on the pass-through portion, and clamping means mounted on the pass-through portion for retaining the hub member to the walled body.

2. The assembly according to claim 1 wherein the sealing means includes an inner conformal seal member, having uncompressed conformity to the interior surface to the walled body, and an outer conformal seal member, having uncompressed conformity to the exterior surface of the walled body, and the walled body is disposed therebetween.

3. The assembly according to claim 2 wherein the clamping means includes a boss on the hub member, having a surface configuration generally conforming to the exterior surface of the walled body, and a collar mounted on the pass-through portion, having a surface configuration generally conforming to the interior surface of the walled body, and a clamping nut threadable onto the pass-through portion for urging the collar toward the boss to form a fluid seal between the hub member and the walled body.

4. The assembly according to claim 3 wherein key means are provided on the hub member and clamping means, for positively locating those components and the sealing means with respect to each other.

5. The assembly according to claim 4 wherein the hub member is formed from materials compatible with the fluid conduit so as to enable the hub member and fluid conduit to be sealingly cemented or welded together.

* * * * *